United States Patent
Yoshihara et al.

(10) Patent No.: US 6,593,032 B1
(45) Date of Patent: *Jul. 15, 2003

(54) STORAGE BATTERY

(75) Inventors: Yasuyuki Yoshihara, Aichi (JP); Yoshihiro Murata, Shizuoka (JP); Takashi Hattori, Aichi (JP); Akira Inanobe, Aichi (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/179,520

(22) Filed: Oct. 27, 1998

(30) Foreign Application Priority Data

Dec. 5, 1997 (JP) ............................................... 9-335356

(51) Int. Cl.⁷ .......................... H01M 4/74; H01M 6/04; H01M 4/64; H01M 4/72; H01M 2/16
(52) U.S. Cl. ...................... 429/241; 429/204; 429/233; 429/255; 429/225; 429/228; 429/60
(58) Field of Search ................................ 429/233, 241, 429/204, 225, 60, 228

(56) References Cited

U.S. PATENT DOCUMENTS

| | | | | |
|---|---|---|---|---|
| 3,867,200 A | * | 2/1975 | Daniels, Jr. ................ | 29/623.1 |
| 3,989,539 A | * | 11/1976 | Grabb ......................... | 429/241 |
| 5,498,496 A | * | 3/1996 | Sasaki et al. ............... | 429/233 |
| 5,527,638 A | * | 6/1996 | Kinoshita et al. .......... | 429/101 |
| 5,849,430 A | * | 12/1998 | Lee ............................. | 429/94 |
| 5,958,625 A | * | 9/1999 | Rao ............................ | 429/241 |

OTHER PUBLICATIONS

R. Perez, "The Complete Battery Book," published 1985 by Tab Books Inc., see p. 33.*

* cited by examiner

*Primary Examiner*—Patrick Ryan
*Assistant Examiner*—Julian Mercado
(74) *Attorney, Agent, or Firm*—RatnerPrestia

(57) ABSTRACT

A storage battery including an electrode and an electrolyte material, in which the electrode has a grid with a mesh area of about 50 mm² or less and an active material provided on the grid. Accordingly, it is made possible to prevent a decrease in the negative electrode's conductivity due to a contraction of the negative electrode active material that takes place extensively when a cycle of charge and discharge is repeated particularly at high temperatures with a resulting remarkable improvement in cycle life characteristics of a lead-acid storage battery.

10 Claims, 5 Drawing Sheets

STORAGE BATTERY

FIELD OF THE INVENTION

The present invention relates to a storage battery and relates, in particular, to a lead-acid storage battery that requires stable cycle life characteristics over a wide range of environmental temperatures.

BACKGROUND OF THE INVENTION

When a lead-acid storage battery is subjected to repeated operations of charge and discharge cycling, the active material of the battery's negative electrode is contracted due to changes in volume of the active material that take place at charging and discharging times. The rate of contraction of the active material is different between the interior and the surface of the active material layer and, therefore, repeated operations of charge and discharge cycling cause the active material to deteriorate in reaction in the inner layer thereof, thereby reducing the capacity of the negative electrode. As a result, life is shortened to create a problem.

In order to prevent the above from occurring, it is proposed that such anti-contraction agents as an organic expander including lignin and the like are added to a negative electrode's active material, thereby achieving enhanced cycle life. According to a prior art structure, however, repeated operations of charge and discharge cycling result in dissolving of an organic expander such as lignin and the like, not allowing to perform the function of an anticontraction agent for a long period.

Therefore, the negative electrode capacity has declined, thereby presenting a problem of shortening battery life. This shortening of battery life is accelerated by operating at elevated temperatures. Thus, life characteristics at high temperatures have been extensively jeopardized when compared with the life characteristics at room temperature.

In recent years, a great deal of efforts has been made on the development of batteries for electric vehicles, wherein many batteries are installed in a limited space and further a high rate of charge and discharge cycles takes place, thereby causing the battery temperatures to be liable to increase. To prevent the batteries' degradation at such high temperatures has been a significant challenge to the industry.

SUMMARY OF THE INVENTION

A storage battery of the present invention comprises an electrode and an electrolyte material, in which the electrode has a grid with each respective mesh measuring about 50 $mm^2$ or less in area, and an active material that is provided on the foregoing grid.

According to the construction as described in the above, it is made possible to prevent a reduction in the negative electrode's conductivity caused by a contraction of the negative electrode active material that takes place noticeably when a charge and discharge cycle is repeated, especially at high temperatures.

DETAILED DESCRIPTION OF THE INVENTION

A storage battery in an exemplary embodiment of the present invention will be explained below with reference to drawings.

An electrode is prepared as follows:

A belt-shaped sheet material formed by rolling a lead alloy is slitted for an expanded grid and then spread to form meshes. This production of an expanded grid is performed by means of a reciprocating method, whereby a belt-shaped sheet is slitted and at the same time spread through an up and down motion of a die cutter.

With a positive electrode's grid, each respective mesh is made to have the same area of 150 $mm^2$ as a prior art positive electrode.

With a negative electrode's grid, a plurality of kinds in mesh area are prepared, one being the same area of 150 $mm^2$ as the prior art negative electrode and the others being a little smaller than the above 150 $mm^2$.

Figure 2:
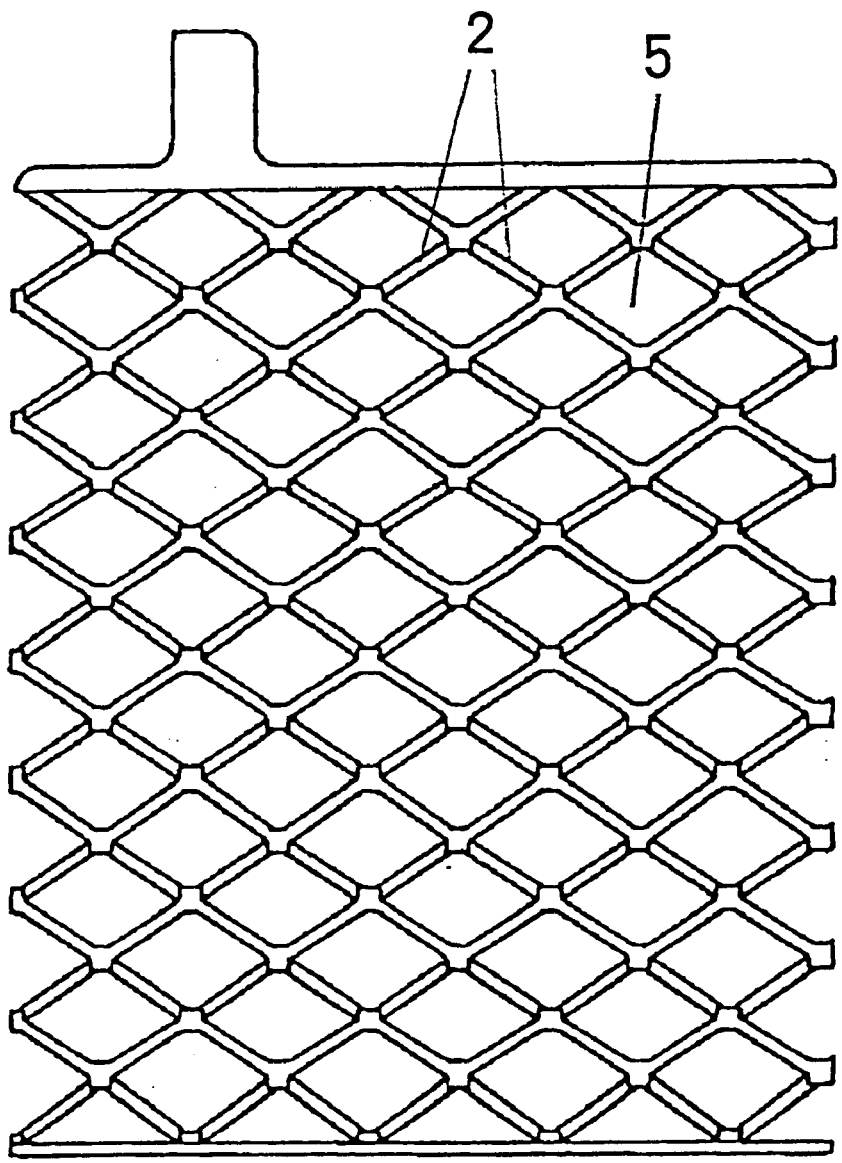
FIG. 2 is a plan view of a grid used with a lead acid storage battery in an exemplary embodiment of the present invention.

FIG. 2 shows an expanded grid of an electrode in an exemplary embodiment of the present invention. A mesh area means the size of an area 5 surrounded by four strand 2 in a grid 10 as shown in FIG. 2. The grid 10 serves two important functions, one being a conductor where electricity is fed from or taken out to the outside of a battery and also electricity is collected from the inside of a battery, thus having a profound effect on a battery's performance.

Using these positive and negative electrodes, a variety of lead-acid storage batteries have been built. All the batteries thus prepared show the rating of 12 V, 60 Ah.

The various lead-acid storage batteries constructed as described in the above are subjected to ⅓ CA discharge cycle life tests at an environmental temperature of 45 degree C.

One cycle of the above cycle life tests constitutes discharging to 9.9 V at a constant current of ⅓ CA and charging by two step constant current charge. The foregoing two step constant current charge is a charging method, whereby a battery is charged for the voltage thereof to reach 14.4 V at a first step charge current (0.2 CA) and then charged for 4 hours at a second step charge current (0.05 CA). A life cycle is defined as cycles that have passed until the discharge capacity of a battery under test decreases to 80% of the rated discharge capacity.

In this way, the various lead-acid storage batteries thus prepared have been tested.

Figure 1:
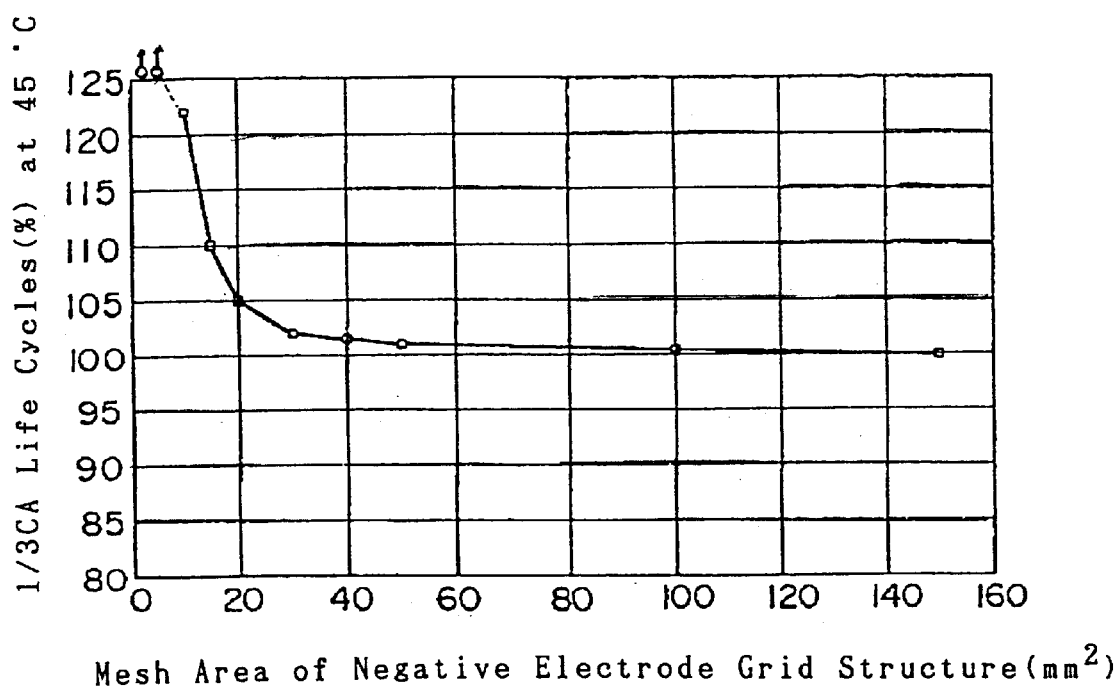
FIG. 1 is a graph to show the relationship between discharge cycle life characteristics and a mesh area of a negative electrode's grid for a lead-acid storage battery in an exemplary embodiment of the present invention.
Figure 5A:
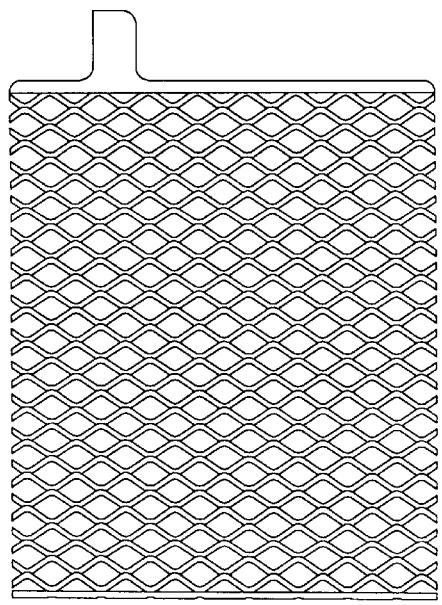
FIGS. 5(a) and 5(b) are plan views showing the difference in size of mesh area of the negative electrode of FIG. 5(a) compared to the mesh area of the positive electrode of FIG. 5(b).
Figure 5B:
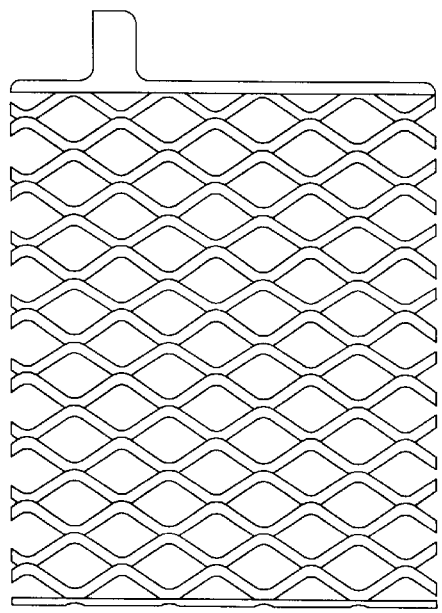

FIG. 1. shows the relationship between ⅓C discharge cycle life characteristics and the size of a mesh area of negative electrode's grid. In FIG. 1, the number of life cycles for various batteries is indicated in percentage with the number of life cycle of a prior art battery with a grid with mesh area of 150 $mm^2$ taken as 100%. According to FIG. 1, as the mesh area decreases, the cycle life becomes longer. When the mesh area decreases to about 50 $mm^2$ or less, the cycle life becomes extensively long. Particularly, in case wherein the mesh area of negative electrode is about 20 mm² or less, excellent life characteristics are realized. Further, when the mesh area is 5 mm² and 2 mm², the life cycle number has reached 125% or more. When the mesh area is 1 mm² or less, the ability to hold the active material has indicated a tendency of decreasing. As the conclusion drawn from the above, it is found out that a lead-acid storage battery using a negative electrode grid with a mesh area of about 50 mm² or less shows a long life. Thus FIG. 5(*a*) shows a negative electrode grid with a smaller mesh area than a positive electrode grid as shown in FIG. 5(*b*).

Figure 3:
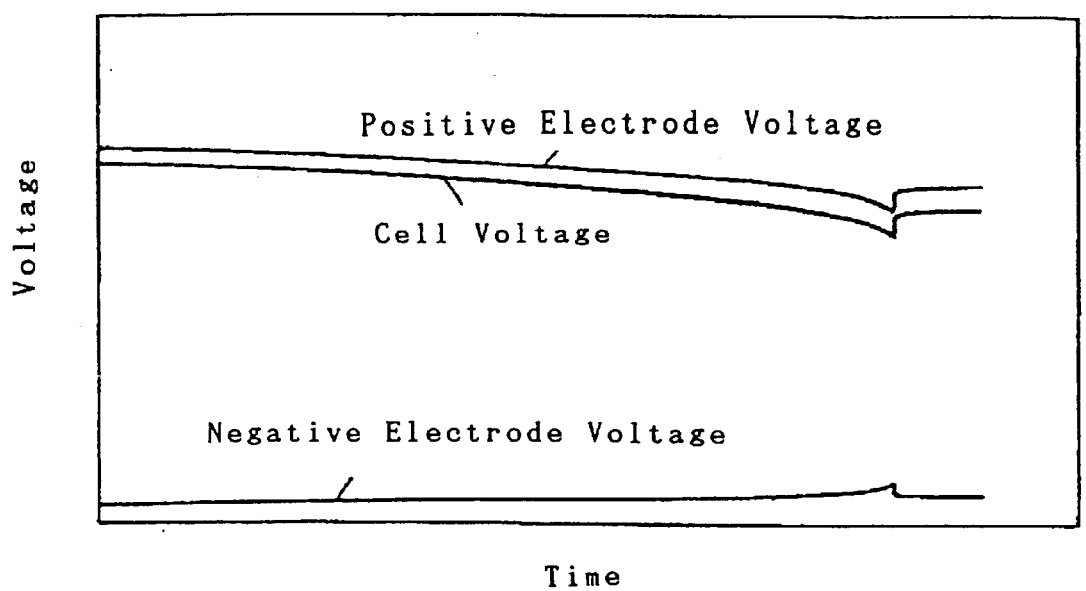
FIG. 3 is a diagram to show discharge characteristics of a lead-acid storage battery in an exemplary embodiment of the present invention.
Figure 4:
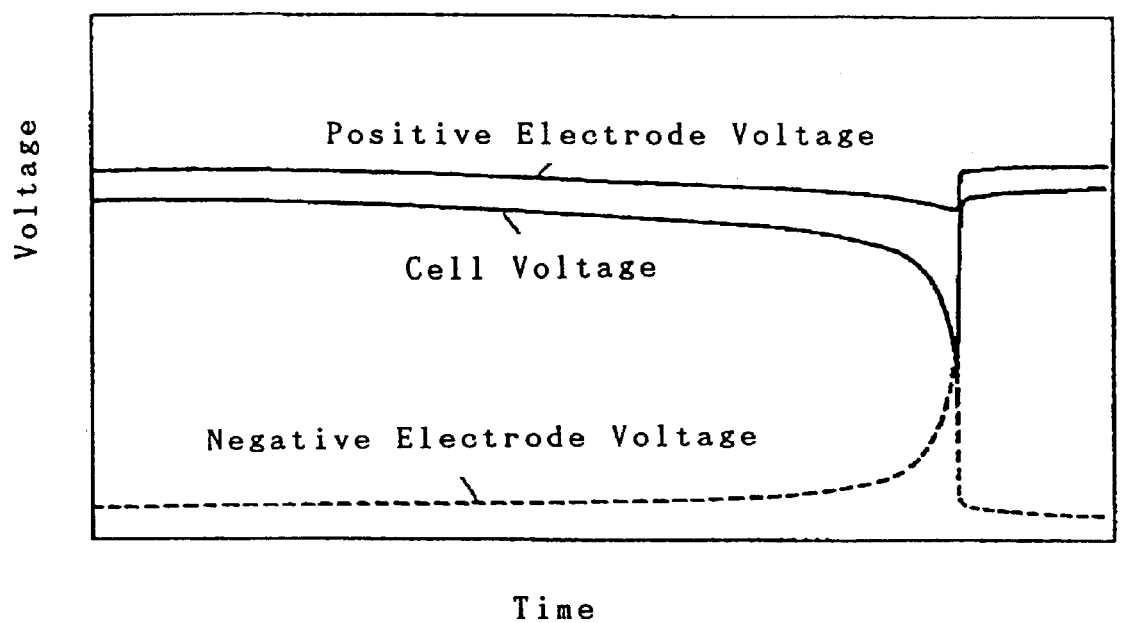
FIG. 4 is a diagram to show discharge characteristics of a prior art lead-acid storage battery.

Furthermore, discharge characteristics of a battery of the present invention and a prior art battery are studied by suspending all the battery tests when the limit of life of the prior art battery has been reached. FIG. 3 and FIG. 4 show the conclusion of the above study. As shown in FIG. 4, the battery capacity of the prior art battery is governed by the negative electrode capacity.

In contrast to this, however, the battery of the present invention does not show any decrease in the negative electrode capacity, thereby indicating that the battery capacity is allowed to be maintained, as shown in FIG. 3.

It is concluded from the above as follows:

When the mesh area of negative electrode grid is about 50 mm² or less, a decrease in the negative electrode's conductivity due to a contraction of the active material that takes place at the time of repeating a cycle of charge and discharge at high temperatures can be prevented, resulting in an improvement of cycle life characteristics.

Particularly, when a grid with a mesh area of about 20 mm² or less, remarkably excellent cycle life characteristics can be realized.

Although a grid of the present exemplary embodiment is produced by means of a reciprocating expansion method, the grid can be produced equally effectively by other methods than the foregoing, like a rotary expansion method, for example.

In the case of the rotary expansion method, a belt-shaped sheet is slitted with the use of a die formed of multiple circular cutters and then spread to a specified width at a separate step of processing.

Further, the same effect can be gained by the use of a grid produced by a conventional casting method.

The effectiveness of the present invention is not governed by the method employed to produce the grid.

The present invention shows an excellent effect with a vented type lead-acid storage battery, too.

A remarkably excellent effect as described in the above can be gained with a sealed type lead-acid storage battery (a valve regulated lead acid storage battery) that is liable to show a heat generating reaction such as an oxygen absorbing cycle during charge and the like and also to show an increase in temperatures due to small thermal capacity caused by a relatively small amount of electrolyte.

As clarified by the description made in the above, use of a negative electrode grid having a mesh area of about 50 mm² or less with a battery of the present invention makes it possible to prevent a decrease in negative electrode's capacity due to a contraction of the negative electrode active material that takes place when a cycle of charge and discharge is repeated at high temperatures, resulting in realization of an excellent lead-acid storage battery with improved cycle life.

What is claimed is:

1. A storage battery comprising a positive electrode, a negative electrode, and an electrolyte material,
wherein said negative electrode has a grid including a plurality of diamond-shaped meshes in a plurality of adjacent rows, said adjacent rows extending from a first edge of said negative electrode grid to a second end of said negative electrode grid, each of said meshes having an area less than 50 mm², said positive electrode during discharge has a grid having a mesh area larger than said mesh area of said negative electrode during discharge, and an active material is provided on said grid of said negative electrode.

2. The storage battery according to claim 1, wherein said grid of said negative electrode is formed of at least one material selected from the group consisting of lead and lead alloys.

3. The storage battery according to claim 1, wherein said grid of said negative electrode is an expanded grid.

4. The storage battery according to claim 1, wherein said grid of said negative electrode is an expanded grid that is formed by processing a belt-shaped sheet.

5. The storage battery according to claim 1, wherein said active material is lead oxide and said electrolyte material is sulfuric acid.

6. The storage battery according to claim 1, wherein said grid of said negative electrode has a mesh area of about 1 mm² or more.

7. A storage battery comprising a positive electrode, a negative electrode and an electrolyte material, wherein said negative electrode has a grid including a plurality of diamond-shaped meshes in a plurality of adjacent rows, said adjacent rows extending from a first edge of said negative electrode grid to a second end of said negative electrode grid, each of said meshes having an area less than 50 mm² and an active material provided on said grid, said grid of said negative electrode being formed of an expanded grid produced by use of a belt-shaped material made from at least one material selected from the group consisting of lead and lead alloys and wherein said positive electrode during discharge includes a grid having a mesh area larger than said mesh area of said negative electrode.

8. A storage battery comprising a positive electrode, a negative electrode, and an electrolyte material,
wherein said negative electrode has a grid including a plurality of diamond-shaped meshes, each of said meshes having an area between 20 mm² and 2 mm², said positive electrode during discharge has a grid having a mesh area larger than said mesh area of said negative electrode during discharge, and an active material is provided on said grid of said negative electrode.

9. A storage battery comprising
a positive electrode,
a negative electrode, and
an electrolyte material,
wherein said negative electrode has a negative grid which includes a plurality of diamond-shaped meshes, said meshes having an area between 50 mm² and 2 mm², and an active material provided on said grid,
said mesh area of the negative grid of said negative electrode during discharge is smaller than a mesh area of a positive grid of said positive electrode during discharge, and
said negative grid is formed of at least one material selected from the group consisting of lead and lead alloys.

10. The storage battery of claim 9, wherein said mesh area of the negative grid of said negative electrode is in a range between 20 mm² and 2 mm².

* * * * *